United States Patent Office 3,322,808
Patented May 30, 1967

3,322,808
NOVEL SILANES AND PROCESS FOR THEIR PRODUCTION
Götz Koerner, Mulheim (Ruhr), Germany, assignor to Th. Goldsmidt A.-G., Essen, Germany
No Drawing. Filed July 30, 1963, Ser. No. 298,582
Claims priority, application Germany, Aug. 3, 1962, G 35,632
21 Claims. (Cl. 260—448.2)

This invention generally relates to organosilicon compounds and is concerned with novel silanes and a process for their preparation. The invention is particularly directed to silanes which may be represented by the following general formula

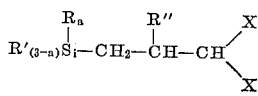

In this formula:

R stands for alkyl or aryl;
R' is halogen;
R" is alkyl, preferably methyl, or hydrogen;
X signifies the group

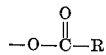

wherein R has the above indicated meaning; and $a$ is a number between 0 and 2.

It is known in the art that allylidenediacetate forms an addition product with methyldiethoxysilane in the presence of a catalyst which consists of platinum precipitated on active carbon (charcoal). This addition reaction proceeds according to the following equation:

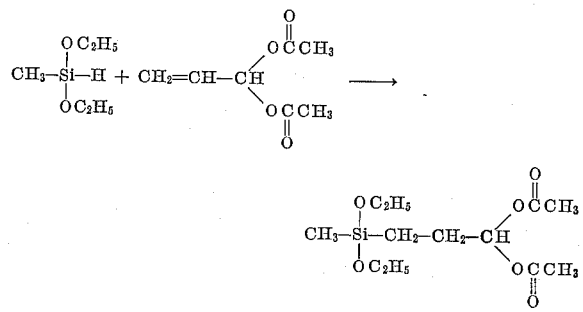

The yield of this reaction amounts to about 51%. It has been established that the above-indicated reaction does not take place in the event that the ethoxy groups of the silane are replaced by chlorine atoms (L. Goodman, R. M. Silverstein, A. Benitez, J. of Amer. Chem. Soc., vol. 79 (1957), page 3074).

It is a primary object of this invention to provide for a procedure which permits the reaction of allylidene compounds with silanes comprising chlorine atoms linked to the silicon of the silane.

It is also an object of this invention to provide novel silane compounds which are useful for various different industrial purposes.

Generally, it is an object of this invention to improve on the art of silane production.

Briefly, and in accordance with this invention, halogen silanes, which may be represented by the general formula

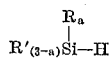

are reacted with an allylidene compound of the general formula

in the presence of platinum catalysts and tertiary amines or amides at elevated temperatures.

In Formula I, R' stands for a halogen atom, preferably chloride or bromine;
R designates alkyl as, for example, methyl, ethyl, isopropyl or dodecyl, or R may be an aryl as, for example, phenyl or tolyl. Also halogenated alkyl groups may be used.

In Formula II, X represents the group

wherein R stands for alkyl or aryl;
R" is alkyl, preferably methyl, or hydrogen. Allylidenediacetate is mentioned as a particularly suitable allylidene starting compound. The reaction is advantageously carried out at a temperature of about between 80 to 180° C.

The term "platinum catalyst" as used herein refers to platinum precipitated on active carbon, hexachloroplatinum acid and, generally, activated platinum precipitated on a suitable carrier substance.

It is essential for successfully carrying out the inventive procedure that, in addition to the platinum catalyst, a tertiary amine or amide is used, as otherwise the desired addition product is not formed.

A large variety of tertiary amines or amides may be used. For purposes of example, the following amines are mentioned: tri-n-butylamine, triethylenediamine, triethylamine, N,N-dimethylaniline, pyridine and trimethyldiethylaminosilane.

Dimethylformamide is an example of a suitable amide.

According to a preferred embodiment of the inventive procedure, methyldichlorosilane or silicochloroform are used as the halogen silane. Thus, for example, if methyldichlorosilane is reacted with allylidenediacetate in the presence of hexachloroplatinum acid and a teriaryamine, γ,γ-diacetoxypropylmethyldichlorosilane is obtained with a yield of about 81%. The reaction may be represented by the following equation:

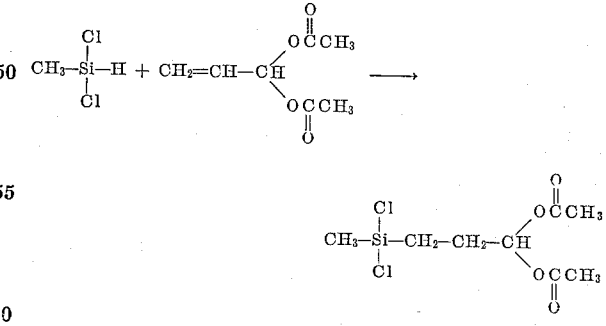

If silicochloroform is used as starting compound and the addition of that compound to allylidenediacetate is caused, γ,γ-diacetoxypropyltrichlorosilane is obtained in high yields.

The inventive procedure may be carried out in different ways. According to one procedure, the silane is admixed with the amine and the mixture thus obtained is added in dropwise manner and under stirring to the heated allylidene compound. The allylidene compound may previously have been admixed with the plainum catalyst and may also contain amine or amide.

According to an alternate procedure, merely the allylidene compound is admixed with the tertiary amine. In some instances, it is of advantage to employ as receiving substance that substance which has the higher boiling point and gradually to add the substance of the lower boiling point during the reaction.

A still further possibility for successfully carrying out the inventive procedure resides in adding a mixture of allylidene compound, silane and amine in dropwise manner to a solution or slurry of the platinum catalyst at elevated temperatures.

The quantity of amine or amide to be employed for carrying out the reaction is dependent on the amount of silane. Calculated on the amount of silane, the amount of tertiary amine or amide is generally 0.001 to 10 mole percent, preferably 0.1 to 5 mole percent.

The reaction proceeds in a particularly advantageous manner in a temperature range of about 80 to 180° C. However, it is also feasible in many instances to proceed at lower temperatures, such as at about 40° C.

The novel silanes obtained in accordance with the inventive procedure may be used for different purposes. They are particularly useful for the impregnation of glass fibers which subsequently are to be coated with polyester epoxide resins or phenol formaldehyde resins.

The invention will now be described by several examples, it being understood, however, that these examples are given by way of illustration and not by way of limitation and that many changes in reaction conditions may be effected without affecting in any way the scope and spirit of this invention as recited in the appended claims.

EXAMPLE I

*Preparation of γ,γ-diacetoxypropylmethyldichlorosilane*

158 grams (1 mole) of allylidenediacetate, 1.85 grams (0.01 mole) of tri-n-butylamine and 0.85 milliliter of a 0.12 molar ethanolic solution of $H_2PtCl_6 \cdot 6H_2O$ were mixed in a three-neck flask. The three-neck flask was fitted with a stirrer, drop funnel, thermometer and reflux cooler. The mixture thus obtained was heated on an oil bath to a temperature of about 120° C. A mixture of 115 grams of methyldichlorosilane (1 mole) and 1.85 grams of tri-n-butylamine (0.01 mole) were added to the mixture in the three-neck flask in dropwise manner and while stirring. A vigorous reaction took place after several minutes. The temperature within the interior of the three-neck flask rose rapidly. A weak reflux was observed at the start of the reaction which stopped after a brief period. The oil bath was thereafter removed and the temperature of the reaction mixture was adjusted by the rate of addition of the methyldichlorosilane/tri-n-butylamine mixture so that a reaction temperature of about 150° C. was obtained. The entire amount of methyldichlorosilane/amine mixture was added within 25 minutes. The reaction product was thereafter distilled through a column, the distillation in the final stages being effected in vacuum. The yield of γ,γ-diacetoxypropylmethyldichlorosilane amounted to 224 grams which corresponds to 82% of the theoretical amount.

Boiling point at 0.7 mm. Hg=115 to 118° C.
Analysis of the reaction product showed the following results.

Theoretical amount: Si, 10.25; C, 35.15; H, 5.13; Cl, 26.00; Acetyl, 31.50; Mol. weight, 273. Actual amount: Si, 10.25; C, 35.40; H, 5.50; Cl, 25.10; Acetyl, 30.70; mol. weight, 265.

EXAMPLE II

*Preparation of γ,γ-diproprionoxypropyl-methyldichlorosilane*

The procedure described in Example I was repeated, but the allylidenediacetate employed in Example I was replaced by 186 grams (1 mole) of allylidenedipropionate. The yield was 240 grams (80% of the theoretical amount); the boiling point at 0.1 mm. Hg was 136 to 142° C.

*Analysis.*—Theoretical amount: Si, 9.3; C, 38.9; H, 6.0; Cl, 23.6. Actual amount: Si, 9.1; C, 39.7; H, 6.2; Cl, 22.9.

EXAMPLE III

*Preparation of γ,γ-diacetoxy-β-methyl-propylmethyldichlorosilane*

The procedure of Example I was repeated but the allylideneacetate was replaced by 172 grams of 1,1-diacetoxy-2-methyl-2-propene. The yield was 202 grams (70.2% of the theoretical amount) while the boiling point at 0.5 mm. Hg was 126 to 130° C.

*Analysis.*—Theoretical amount: Si, 9.7; C, 37.6; H, 5.6; Cl, 24.7. Actual amount: Si, 9.2; C, 37.8; H, 5.4; Cl, 23.6.

EXAMPLE IV

*Preparation of γ,γ-diacetoxypropyl-methyldiethoxysilane*

273 grams (1 mole) of γ,γ-diacetoxypropylmethyldichlorosilane were dissolved in 1 liter of methylenechloride. A mixture of 93 grams (2.02 moles) of ethanol and 222.6 grams (2.2 moles) of triethylamine were gradually dropped into this solution under stirring and boiling under reflux. The speed of addition of the ethanol-triethylamine mixture was adjusted so that the reaction mixture was maintained moderately boiling. The reaction product was then filtered and the salt obtained was washed with methylene choloride. The filtrate was distilled. The yield was 204 grams (70% of the theoretical amount) while the boiling point at 0.05 mm. Hg. was 94 to 100° C.

The IR-spectra of this substance and the γ,γ-diacetoxypropylmethyldiethoxysilanes prepared according to L-Goodman et al. (J. Amer. Chem. Soc., vol. 79, page 3074 (1957)) from methyldiethoxysilane and allylidenediacetate are identical.

*Analysis.*—Theoretical amount: Si, 9.6; C, 49.3; H, 8.2. Actual amount: Si, 9.7; C, 49.2; H, 8.4.

EXAMPLE V

*Preparation of γ,γ-diacetoxypropylmethyldichlorosilane*

The procedure of Example I was repeated. However, the tri-n-butylamine of Example I was replaced by two portion each of 1.21 grams (0.01 mole) of dimethylaniline. The yield was 190 grams, which is 69.6% of the theoretical amount. The boiling point at 1 mm. Hg was 117 to 122° C.

While specific embodiments of the invention have been shown and described in detail to illustrate the application of the inventive principles, it will be understood that this invention may be embodied otherwise without departing from such principles.

What is claimed is:
1. A silane of the general formula

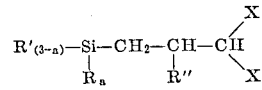

wherein R is a monovalent hydrocarbon selected from the group consisting of alkyl and aryl, R' is halogen, R'' is selected from the group consisting of methyl and hydrogen, X stands for the group

wherein R has the above-indicated meanings, and *a* is a number between 0 and 2.

2. A silane as claimed in claim 1, wherein R' is chlorine.
3. A silane according to claim 1, wherein R is methyl.
4. A silane according to claim 1, wherein R is phenyl.

5. A silane according to claim 1, wherein X is acetoxy.
6. The silane of the formula

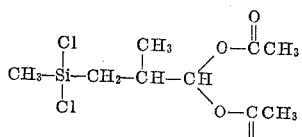

7. The silane of the formula

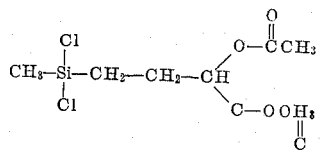

8. A process of preparing silanes of the general formula

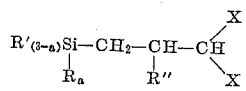

wherein R is a monovalent hydrocarbon selected from the group consisting of alkyl and aryl, R' is halogen, R'' is selected from the group consisting of methyl and hydrogen, X stands for

wherein R has the above-indicated meaning and $a$ is a number between 0 and 2, which comprises reacting at elevated temperatures a halogen silane of the general formula

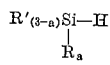

wherein the symbols have the above-indicated meaning, with an allylidene compound of the general formula

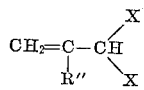

wherein the symbols have the above-indicated meaning, said reaction being carried out in the presence of a platinum catalyst and a tertiary nitrogen compound selected from the group consisting of tertiary amines and dimethylformamide.

9. A process as claimed in claim 8, wherein said reaction is carried out at a temperature of about between 80 to 180° C.

10. A process as claimed in claim 8, wherein said halogen silane is methyldichlorosilane.

11. A process as claimed in claim 8, wherein said halogen silane is trichlorosilane.

12. A process as claimed in claim 8, wherein said allylidene compound is allylidenediacetate.

13. A process as claimed in claim 8, wherein the amount of said tertiary nitrogen compound, calculated on the amount of halogen silane, is between about 0.001 to 10 mole percent.

14. A process as claimed in claim 8, wherein said platinum catalyst is selected from the group consisting of hexachloroplatinum acid, platinum precipitated on activated carbon and activated platinum precipitated on a carrier substance other than activated carbon.

15. A process as claimed in claim 8, wherein said nitrogen compound is tri-n-butylamine.

16. A process of preparing silanes of the general formula

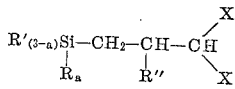

wherein R is a monovalent hydrocarbon selected from the group consisting of alkyl and aryl, R' is halogen, R'' is selected from the group consisting of methyl and hydrogen, X stands for

wherein R has the above-indicated meaning and $a$ is a number between 0 and 2, which comprises reacting a silane of the general formula

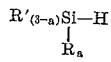

wherein the symbols have the above-indicated meaning with an allylidene compound of the general formula

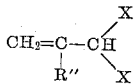

wherein the symbols have the above-indicated meaning, said reaction being carried out at a temperature of about between 80 to 180° C. and in the presence of a platinum catalyst and a tertiary nitrogen compound selected from the group consisting of tertiary amines and dimethylformamide, said tertiary nitrogen compound, calculated on the amount of halogen silane, being present in a quantity corresponding to about 0.001 to 10 mole percent.

17. A process as claimed in claim 8, wherein said nitrogen compound is triethylenediamine.

18. A process as claimed in claim 8, wherein said nitrogen compound is triethylamine.

19. A process as claimed in claim 8, wherein said nitrogen compound is N-N-dimethylaniline.

20. A process as claimed in claim 8, wherein said nitrogen compound is pyridine.

21. A process as claimed in claim 8, wherein said nitrogen compound is trimethyldiethylaminosilane.

References Cited
UNITED STATES PATENTS

| | | | |
|---|---|---|---|
| 2,823,218 | 2/1958 | Speier et al. | 260—448.2 |
| 2,860,153 | 11/1958 | Saam | 260—448.2 |
| 3,099,670 | 7/1963 | Prober | 260—448.2 |

FOREIGN PATENTS

| | | |
|---|---|---|
| 1,140,577 | 12/1962 | Germany. |

OTHER REFERENCES

Eaborn: "Organosilicon Compounds," Academic Press, Inc., New York, Publ. Co., 1960 pages 51–55, 60–62 and 228.

Goodman et al.: Ibid, vol. 79, June 1957 pages 3073–7.

Speier et al.: "Jour. American Chem. Soc.," vol. 78, May 1956, pages 2278–81.

TOBIAS E. LEVOW, *Primary Examiner.*

SAMUEL H. BLECH, *Examiner.*

P. F. SHAVER, *Assistant Examiner.*